United States Patent
Kneckt et al.

(10) Patent No.: US 8,477,674 B2
(45) Date of Patent: Jul. 2, 2013

(54) WIRELESS NETWORK INCLUDING POST GROUPCAST TIME

(75) Inventors: Jarkko Kneckt, Espoo (FI); Janne Marin, Espoo (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 1363 days.

(21) Appl. No.: 12/075,573

(22) Filed: Mar. 12, 2008

(65) Prior Publication Data

US 2009/0232042 A1 Sep. 17, 2009

(51) Int. Cl.
*H04H 20/71* (2008.01)

(52) U.S. Cl.
USPC .......................................... 370/312; 370/318

(58) Field of Classification Search
USPC .................................................. 370/312, 318
See application file for complete search history.

(56) References Cited

U.S. PATENT DOCUMENTS

| | | | |
|---|---|---|---|
| 6,917,598 B1 | 7/2005 | Emeott et al. | 370/311 |
| 6,973,052 B2 | 12/2005 | Wang et al. | 370/278 |
| 7,286,551 B2 | 10/2007 | Park et al. | 370/412 |
| 7,564,826 B2 | 7/2009 | Sherman et al. | 370/338 |
| 7,590,100 B2 | 9/2009 | Smith et al. | 370/346 |
| 7,746,879 B2 | 6/2010 | Kangude et al. | 370/406 |
| 2005/0047386 A1 | 3/2005 | Yi | |
| 2005/0233704 A1* | 10/2005 | Maekawa | 455/69 |
| 2006/0034219 A1 | 2/2006 | Gu et al. | 370/329 |
| 2006/0056382 A1 | 3/2006 | Yamada et al. | 370/349 |
| 2006/0193285 A1 | 8/2006 | Roy et al. | |
| 2006/0253735 A1 | 11/2006 | Kwak et al. | 714/12 |
| 2006/0253736 A1 | 11/2006 | Rudolf et al. | 714/12 |
| 2006/0268716 A1 | 11/2006 | Wijting et al. | 370/235 |
| 2006/0268749 A1 | 11/2006 | Rahman et al. | 370/256 |
| 2006/0271703 A1 | 11/2006 | Kim et al. | |
| 2006/0285517 A1* | 12/2006 | Kakani | 370/329 |

(Continued)

FOREIGN PATENT DOCUMENTS

| | | |
|---|---|---|
| EP | 1 684 467 A1 | 7/2006 |
| EP | 1 708 439 A1 | 10/2006 |

(Continued)

OTHER PUBLICATIONS

"Wireless LANS, Power save for 802.11s", Jarkko Kneckt, et al., IEEE 802.11-08/0168r1, Jan. 2008, 9 pgs.

(Continued)

*Primary Examiner* — Sai-Ming Chan
(74) *Attorney, Agent, or Firm* — Harrington & Smith

(57) ABSTRACT

In one aspect thereof the invention provides a method that includes transmitting from a first (beaconing) mesh point at least one multicast or broadcast frame; and transitioning the first mesh point to a lower power mode of operation state after expiration of a specified post groupcast time from a last multicast or broadcast frame that was transmitted by the beaconing mesh point after expiration of an awake window, or when the awake window expires, whichever occurs later. In another aspect thereof the invention provides a method that includes operating a peer mesh point in an awake state; and maintaining the peer mesh point in the awake state for no more than a specified post groupcast time after a last target beacon transmission time, or a last received beacon frame, or a receipt of multicast or broadcast frame having an indication that another multicast or broadcast frame will be transmitted. A computer-readable medium storing program instructions to implement the methods is also disclosed, as are corresponding apparatus.

15 Claims, 7 Drawing Sheets

U.S. PATENT DOCUMENTS

| | | | |
|---|---|---|---|
| 2006/0285528 A1 | 12/2006 | Gao et al. | |
| 2007/0060141 A1 | 3/2007 | Kangude et al. | 455/445 |
| 2007/0086471 A1 | 4/2007 | Igarashi et al. | 370/412 |
| 2007/0124443 A1 | 5/2007 | Nanda et al. | 709/223 |
| 2007/0129093 A1* | 6/2007 | Chou et al. | 455/69 |
| 2007/0242634 A1* | 10/2007 | Calcev et al. | 370/318 |
| 2007/0254591 A1* | 11/2007 | Nassimi | 455/63.3 |
| 2007/0263647 A1 | 11/2007 | Shorty et al. | 370/406 |
| 2008/0112347 A1* | 5/2008 | Gossain et al. | 370/311 |
| 2008/0205385 A1 | 8/2008 | Zeng et al. | |
| 2009/0067373 A1 | 3/2009 | Kneckt et al. | 370/328 |
| 2009/0129309 A1 | 5/2009 | Thubert et al. | |

FOREIGN PATENT DOCUMENTS

| | | |
|---|---|---|
| WO | WO 2005/006658 A1 | 1/2005 |
| WO | WO 2007/063427 A1 | 1/2005 |
| WO | WO-2006/099134 | 9/2006 |
| WO | WO 2008/066814 A1 | 6/2008 |
| WO | WO 2008/104095 A1 | 9/2008 |

OTHER PUBLICATIONS

"Draft Standard for Information Technology-Telecommunications and information exchange between systems-Local and metropolitan area networks-Specific requirements-Part 11: Wireless LAN Medium Access Control (MAC and Physical Layer (PHY) specifications", IEEE P802.11 s™/D1.08, 249 pgs.

"Draft Standard for Information Technology-Telecommunications and information exchange between systems-Local and metropolitan area networks-Specific requirements-Part 11: Wireless LAN medium Access Control (MAC) and Physical Layer (PHY) specifications, Amendment 9: wireless Network Management", IEEE P802.11v/D2.0, Feb. 2008, 237 pgs.

"Principles of IEEE 802.11s", Guido R. Hiertz, et al., IEEE 2007, pp. 1002-1007.

"Evaluation of EDCF Mechanism for QoS in IEEE802.11 Wireless Networks", Daqing Gu et al., TR-2003-51, May 2003, 7 pgs.

IEEE Standard 802.1 le Part 11: Wireless LAN Medium Access Control (MAC) and Physical Layer (PHY) specifications, Amendment 8: Medium Access Control (MAC) Quality of Service Enhancements, IEEE, 189 pgs.

"Information technology—Telecommunications and information exchange between systems—Local and metropolitan area networks-Specific requirements", Par 11: Wireless Lan Medium Access Control (MAC) and Physical Layer (PHY) Specifications, LAN MAN Standards Committee of the IEEE Computer Society, Ansuieee Std. 801.11, 1999 Edition (R2003), pp. 12, 129, 133-136, 304, 307.

Wang, X., et al., "IEEE 802.11s wireless mesh networks; framework and challenges", Ad Hoc Networks, available online.22.10.2007, 2007 Elsevier B.V., vol. 6, 2008, pp. 970-984, section 3.3.3 and 3.3.5.

\* cited by examiner

THE SOURCE AND THE DESTINATION OF THE MSDUs
IS WITHIN 1-HOP NEIGHBORHOOD
NO FORWARDING, ROUTING OR LINK METRIC IS USED

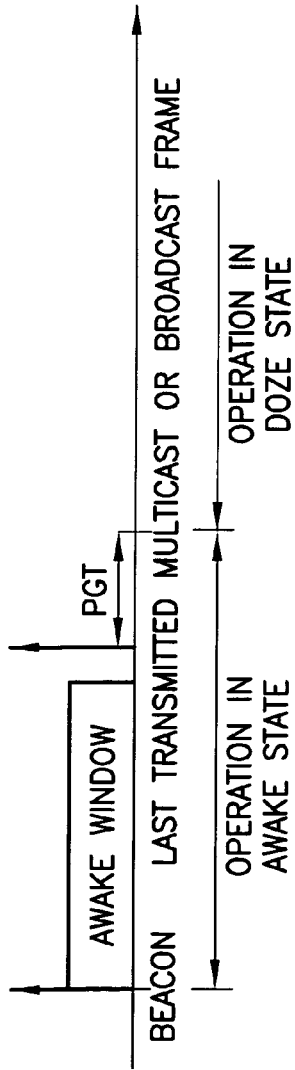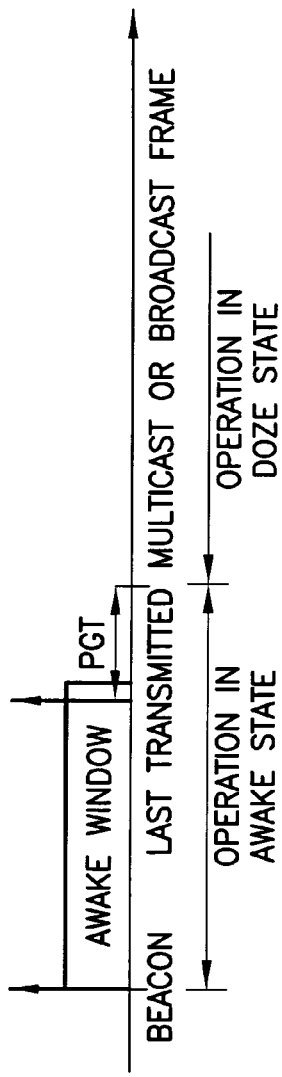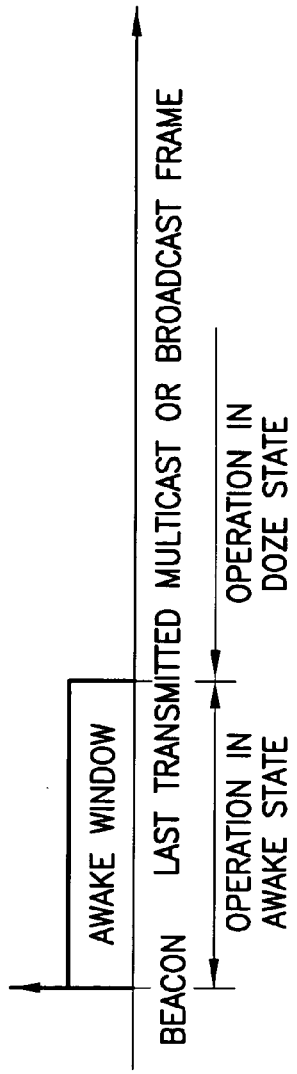

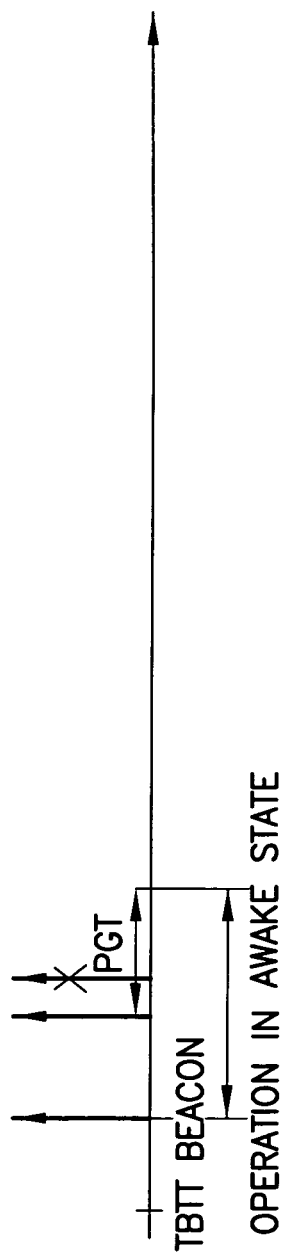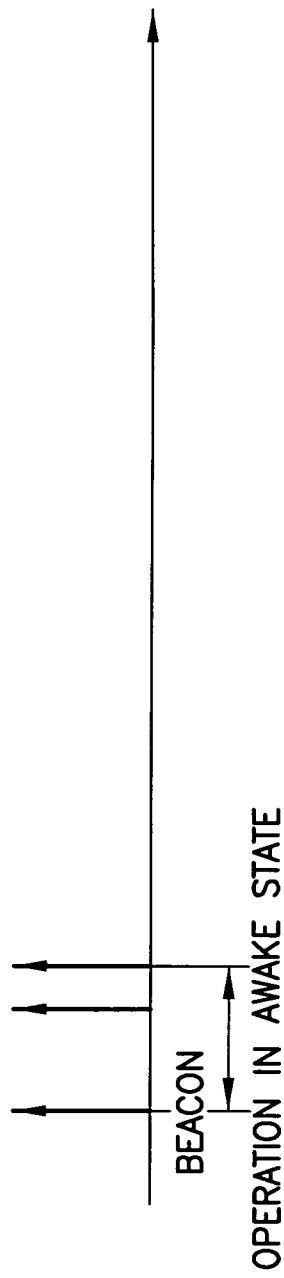

WIRELESS NETWORK INCLUDING POST GROUPCAST TIME

TECHNICAL FIELD

The exemplary and non-limiting embodiments of this invention relate generally to wireless communication systems, methods, devices and computer programs and, more specifically, relate to power management techniques.

BACKGROUND

The following abbreviations are utilized herein:
802.11s mesh networking described by the IEEE 802.11s draft amendment
ACK acknowledgment (acknowledgment message)
AP access point
ATIM announcement traffic indication message
BC broadcast
BSS basic service set
DTIM delivery traffic indication message
FBMS Flexible Broadcast and Multicast Service
GAS generic advertisement service
IBSS independent basic service set
IEEE institute of electrical and electronics engineers
MAC medium access control (layer 2, L2)
MAP mesh access point
MC multicast
MIB management information base
MIMO multiple input/multiple output
MP mesh point
MSDU MAC service data unit
PGT post groupcast time
PS power save
STA station
TBTT target beacon transmission time
TIM traffic indication message
WiMAX worldwide interoperability for microwave access (IEEE 802.16 standard)
WLAN wireless local area network One publication of interest to the ensuing description is:
IEEE P802.11s™/D1.08, Draft STANDARD for Information Technology-Telecommunications and information exchange between systems Local and metropolitan area networks Specific requirements Part 11: Wireless LAN Medium Access Control (MAC) and Physical Layer (PHY) specifications Mesh Networking (January 2008).

In accordance with draft 1.08 of 802.11s, coordination of devices within radio range is achieved by the exchange of beacon frames. Periodic beacon transmission enables device discovery, supports dynamic network organization, and provides support for mobility.

As described in the IEEE P802.11s™ Draft Standard, in section 5.2.9.1 "Introduction to mesh", in WLAN deployments without mesh services, stations (STAs) must associate with an access point (AP) in order to gain access to the network. These STAs are dependent on the AP with which they are associated to communicate. An example of a non-mesh WLAN deployment model and device classes are illustrated herein in FIG. 1, which reproduces FIG. s1 of the IEEE P802.11s™ Draft Standard.

Many WLAN devices can benefit from support for more flexible wireless connectivity. Functionally, the distribution system of an access point can be replaced with wireless links or multihop paths between multiple APs. Devices traditionally categorized as clients can benefit from the ability to establish peer-to-peer wireless links with neighboring clients and APs in a mesh network.

An example mesh is illustrated in FIG. 2, which reproduces FIG. s2 of the IEEE P802.11s™ Draft Standard. Mesh points (MPs) are entities that support mesh services, i.e., they participate in the formation and operation of the mesh network. An MP may be collocated with one or more other entities (e.g., AP, portal, etc.). The configuration of an MP that is collocated with an Access Point is referred to as a MAP. Such a configuration allows a single entity to logically provide both mesh functionalities and AP functionalities simultaneously. STAs associate with APs to gain access to the network. Only MPs participate in mesh functionalities such as path selection and forwarding, etc. Mesh portals (MPPs) interface the network to other IEEE 802 LAN segments.

As is stated in section 5.2.9.2, "Mesh network model", of the IEEE P802.11s™ Draft Standard, a mesh network is an IEEE 802 LAN comprised of IEEE 802.11 links and control elements to forward frames among the network members. Effectively, this means that a mesh network appears functionally equivalent to a broadcast Ethernet from the perspective of other networks and higher layer protocols. Thus, it normally appears as if all MPs in a mesh are directly connected to the link layer. This functionality is transparent to higher layer protocols. Reference in this regard can be made to FIG. 3A, which reproduces FIG. s-3 of the IEEE P802.11s™ Draft Standard. It should be noted that while this figure shows the forwarding of data over multiple hops, there may also be direct data transfer over a single hop, such as is shown in FIG. 3B, wherein the source and destination of the MSDUs are within a one-hop neighborhood, and where no forwarding, routing or link metric need be used.

In an infrastructure Basic Service Set (BSS), stations rely on the AP for power saving. A station informs the AP before switching from active mode to power save mode. If any STA in BSS operates in power save mode, the AP buffers multicast or broadcast traffic and delivers them after the Delivery Traffic Indication Message (DTIM) beacon. The DTIM interval is a multiple of beacon periods. For unicast traffic that is buffered in the AP, stations periodically need to wake up to receive the Traffic Indication Map (TIM) that is present in all beacon frames. Having learned from a beacon frame that unicast traffic directed to the station is pending, a station sends out a Power Save (PS)-Poll frame or APSD trigger frame to request the traffic's delivery from the AP.

In an independent Basic Service Set (IBSS) mode, also known as ad-hoc, the basic approach is similar to the infrastructure BSS case in that the STAs are synchronized, and multicast traffic and the traffic that are to be transmitted to a power-conserving STA are first announced during a period when all STAs are awake. The announcement is accomplished via a message sent in an Announcement Traffic Indication Message (ATIM) Window. A STA in the power save mode shall listen for these announcements to determine if it needs to remain in the awake state. The presence of the ATIM window in the IBSS indicates if the STA may use the PS Mode. To maintain correct information on the power save state of other STAs in an IBSS, a STA needs to remain awake during the ATIM window. At other times the STA may enter the doze state.

The current IEEE 802.11s specification defines an efficient power saving mechanism, which reduces the amount of time during which the MP should remain awake. However, neighboring MPs should be able to know when a peer MP is awake and accessible for transmission of unscheduled frames. This is achieved by the use of an Awake Window, which is present after delivery traffic indication message (DTIM) beacons, and may be included after traffic indication map (TIM) beacons and the probe response frame. The Awake Window is defined in such way that a power saving MP is to remain awake for the duration of the Awake Window after a Beacon with an Awake Window element. The DTIM period is defined per mesh point.

However, this approach can be disadvantageous when the Awake Window is also used to transmit broadcast and multicast frames, as the duration of the Awake Window should include time for multicast and broadcast frame transmission, as well as time for peer service period triggering. If a network has a high traffic load it may be the case that the multicast and broadcast frame transmissions do not all fit within the Awake Window and are thus transmitted after the Awake Window. This reduces the network efficiency when the MP must wait until the next Awake Window to have an opportunity to transmit frames other than multicast and broadcast frames.

Another problem with multicast and broadcast frames is that they are not acknowledged by the receiver. As a result a transmitting MP cannot know if the peer MP(s) have received a last multicast or broadcast frame, which includes an indication that there will not be any additional frames to be received. Absent this information the peer MP must stay awake until the next beacon transmission, thereby needlessly consuming power.

SUMMARY

The foregoing and other problems are overcome, and other advantages are realized, by the use of the exemplary embodiments of this invention.

In accordance with a first aspect thereof the exemplary embodiments of this invention provide a method that comprises transmitting from a first mesh point, such as a beaconing mesh point, at least one multicast or broadcast frame; and transitioning the beaconing mesh point to a lower power mode of operation state after expiration of a specified post groupcast time from a last multicast or broadcast frame that was transmitted by the beaconing mesh point after expiration of an awake window, or when the awake window expires, whichever occurs later.

In another aspect the exemplary embodiments of this invention provide a computer-readable medium that stores program instructions, the execution of which results in operations that comprise transmitting from a first mesh point, such as a beaconing mesh point, at least one multicast or broadcast frame; and transitioning the beaconing mesh point to a lower power mode of operation state after expiration of a specified post groupcast time from a last multicast or broadcast frame that was transmitted by the beaconing mesh point after expiration of an awake window, or when the awake window expires, whichever occurs later.

In another aspect the exemplary embodiments of this invention provide an apparatus that includes a wireless transmitter; a wireless receiver; and a control unit configurable, when operating the apparatus as a first mesh point, such as a beaconing mesh point, to transmit at least one multicast or broadcast frame and to transition to a lower power mode of operation state after expiration of a specified post groupcast time from a last multicast or broadcast frame that was transmitted after expiration of an awake window, or when the awake window expires, whichever occurs later.

In a further aspect the exemplary embodiments of this invention provide a method that comprises operating a first mesh point, such as a peer mesh point, in an awake state; and maintaining the peer mesh point in the awake state for no more than a specified post groupcast time after a last target beacon transmission time, or a last received beacon frame, or a receipt of multicast or broadcast frame having an indication that another multicast or broadcast frame will be transmitted.

In another aspect the exemplary embodiments of this invention provide a computer-readable medium that stores program instructions, the execution of which results in operations that comprise operating a first mesh point, such as a peer mesh point, in an awake state; and maintaining the peer mesh point in the awake state for no more than a specified post groupcast time after a last target beacon transmission time, or a last received beacon frame, or a receipt of multicast or broadcast frame having an indication that another multicast or broadcast frame will be transmitted.

In yet another aspect the exemplary embodiments of this invention provide an apparatus that includes a wireless transmitter; a wireless receiver; and a control unit configurable, when operating the apparatus as a first mesh point, such as a peer mesh point, to maintain the peer mesh point in the awake state for no more than a specified post groupcast time after a last target beacon transmission time, or a last received beacon frame, or a receipt of multicast or broadcast frame having an indication that another multicast or broadcast frame will be transmitted.

In yet another aspect the exemplary embodiments of this invention provide an apparatus that comprises means for transmitting from a first mesh point at least one multicast or broadcast frame, and means for transitioning the first mesh point to a lower power mode of operation state after expiration of a specified post groupcast time from a last multicast or broadcast frame that was transmitted by the first mesh point after expiration of an awake window, or when the awake window expires, whichever occurs later. The value of the post groupcast time may be specified in one or both of a global manner and a per link manner.

In accordance with a still further aspect the exemplary embodiments of this invention provide an apparatus that includes means for operating a first mesh point in an awake state and means for maintaining the first mesh point in the awake state for no more than a specified post groupcast time after a last target beacon transmission time, or a last received beacon frame, or a receipt of multicast or broadcast frame having an indication that another multicast or broadcast frame will be transmitted. The value of the post groupcast time may be specified to the first mesh point in one or both of a global manner and a per link manner.

BRIEF DESCRIPTION OF THE DRAWINGS

In the attached Drawing Figures:

FIGS. 5A, 5B and 5C, collectively referred to as FIG. 5, depict beaconing MP operation in the awake state for a last MC transmission (FIG. 5A), a case where the last multicast transmission is performed within the Awake Window (FIG. 5B), and a case where no multicast or broadcast frames are transmitted (FIG. 5C).

FIGS. 7A and 7B, collectively referred to as FIG. 7, depict termination of receiver media listening when the last frame was incorrectly received and termination of receiver media listening when the last frame was correctly received, respectively.

DETAILED DESCRIPTION

As described in more detail below, the exemplary embodiments of the invention provide power saving in WLAN MESH networks, in WLAN ad-hoc networks and in other wireless networks.

The use of the exemplary embodiments of the invention provide an assurance that there will exist some predefined duration of time when a neighboring MP knows that another MP is accessible, and also provides an assurance that all MPs can return to a power save state, for example to the doze state, after the predefined duration of time expires. Both of these features may be realized using the same mechanism.

Regarding a first device and a second device in a mesh network (e.g., an IEEE 802.11s mesh network), the second device is considered a "peer MP" of the first device if there is an authenticated communication link between the first device and the second device (i.e., a communication link with one or more messages being directed from/to the first device to/from the second device, also referred to as a peer link). A non-peer MP is only able to use frames, which do not require authentication, when communicating with the other MP. Non-limiting examples of such frames include probe requests, peer link open frames or Generic Advertisement Service (GAS) query frames. As an example, a non-peer may receive a beacon message from a first device and respond with a frame in an attempt to establish a peer relationship with the first device.

For reference purposes, a "beaconing MP" refers to the MP that transmits the beacon. Generally, this term will be used in conjunction with a non-peer MP that receives the beacon from the beaconing MP and desires to establish a peer relationship by responding to the beacon (i.e., transmitting a frame to the beaconing MP).

Figure 1:
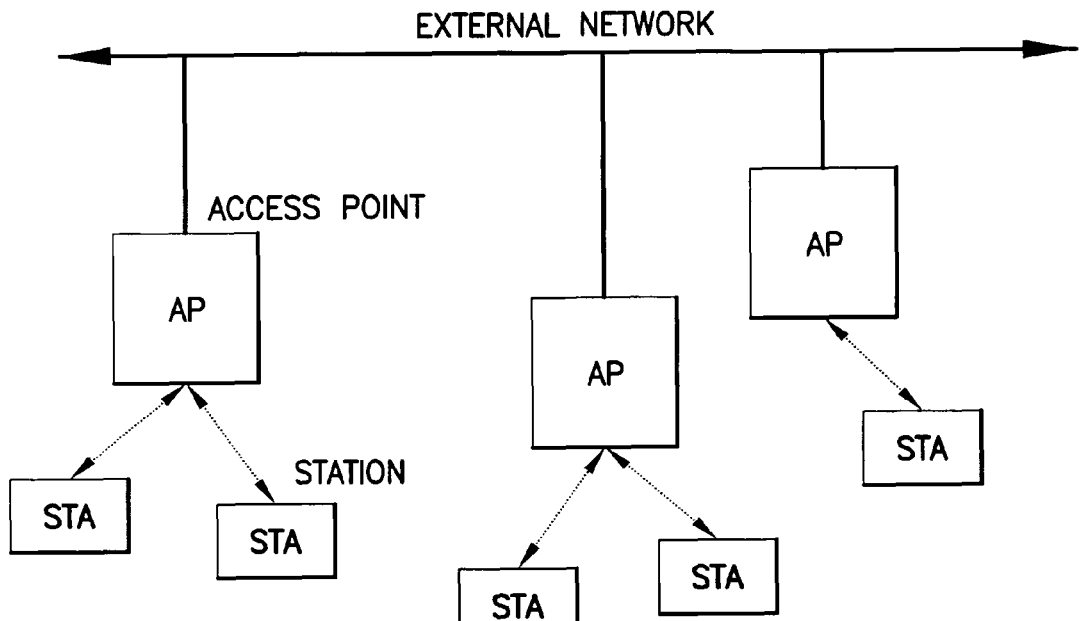
FIG. 1 reproduces FIG. s1 of the IEEE P802.11s™ Draft Standard, and shows a nonmesh IEEE 802.11 deployment model and device classes.
Figure 2:
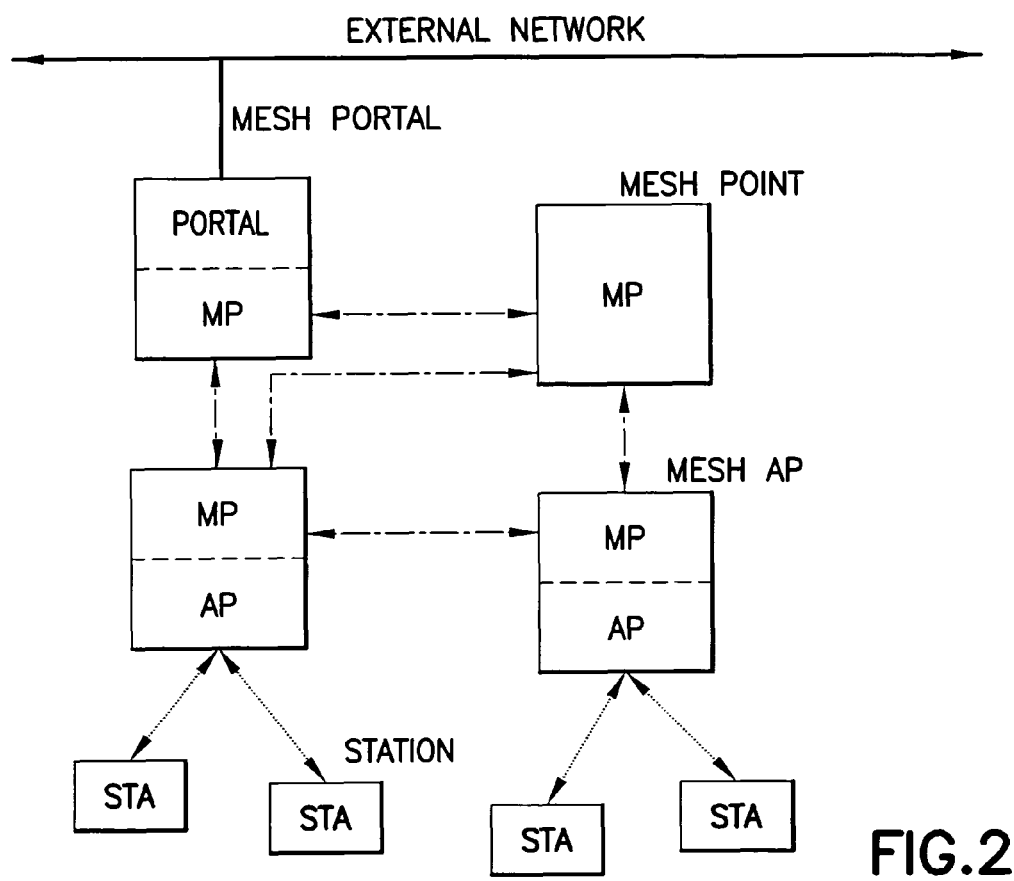
FIG. 2 reproduces FIG. s2 of the IEEE P802.11s™ Draft Standard, and shows a mesh containing MPs, MAPs, and STAs.
Figure 3A:
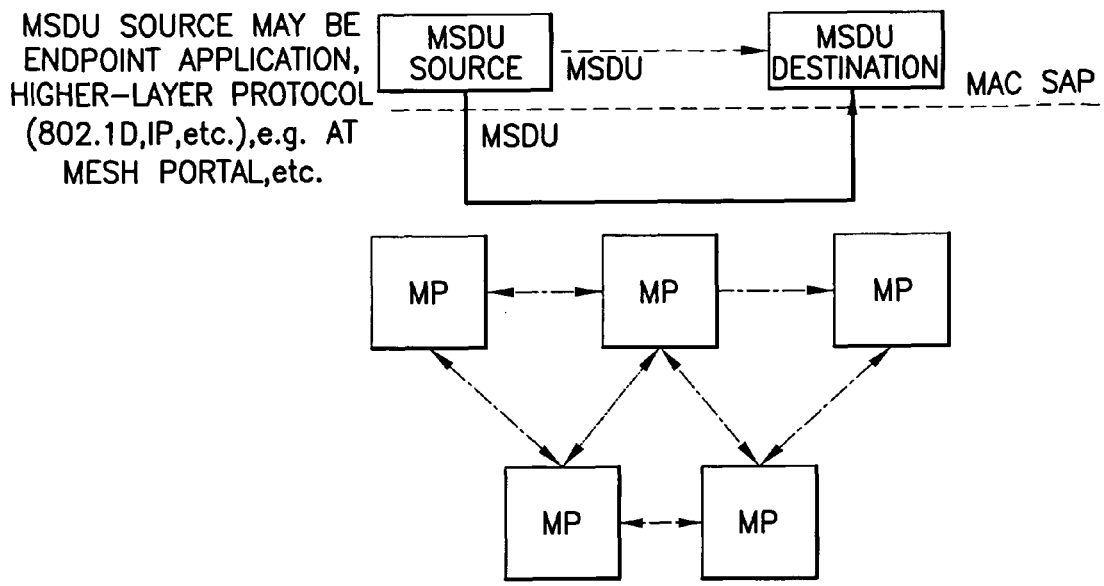
FIG. 3A reproduces FIG. s3 of the IEEE P802.11s™ Draft Standard, and shows MAC data transport over a Mesh.
Figure 3B:
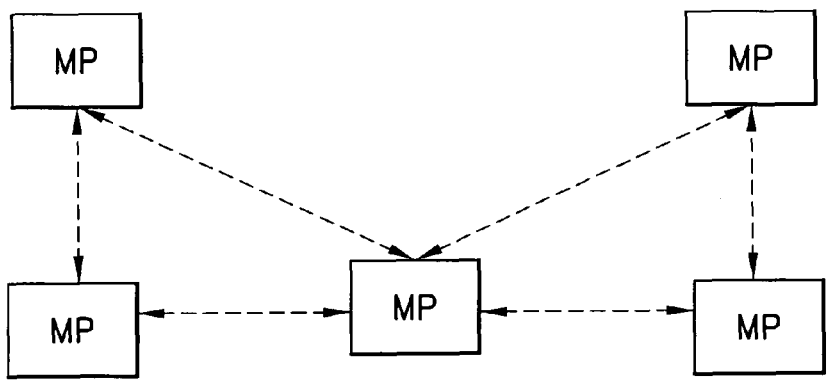
FIG. 3B depicts an exemplary ad-hoc one hop networking model.
Figure 4:
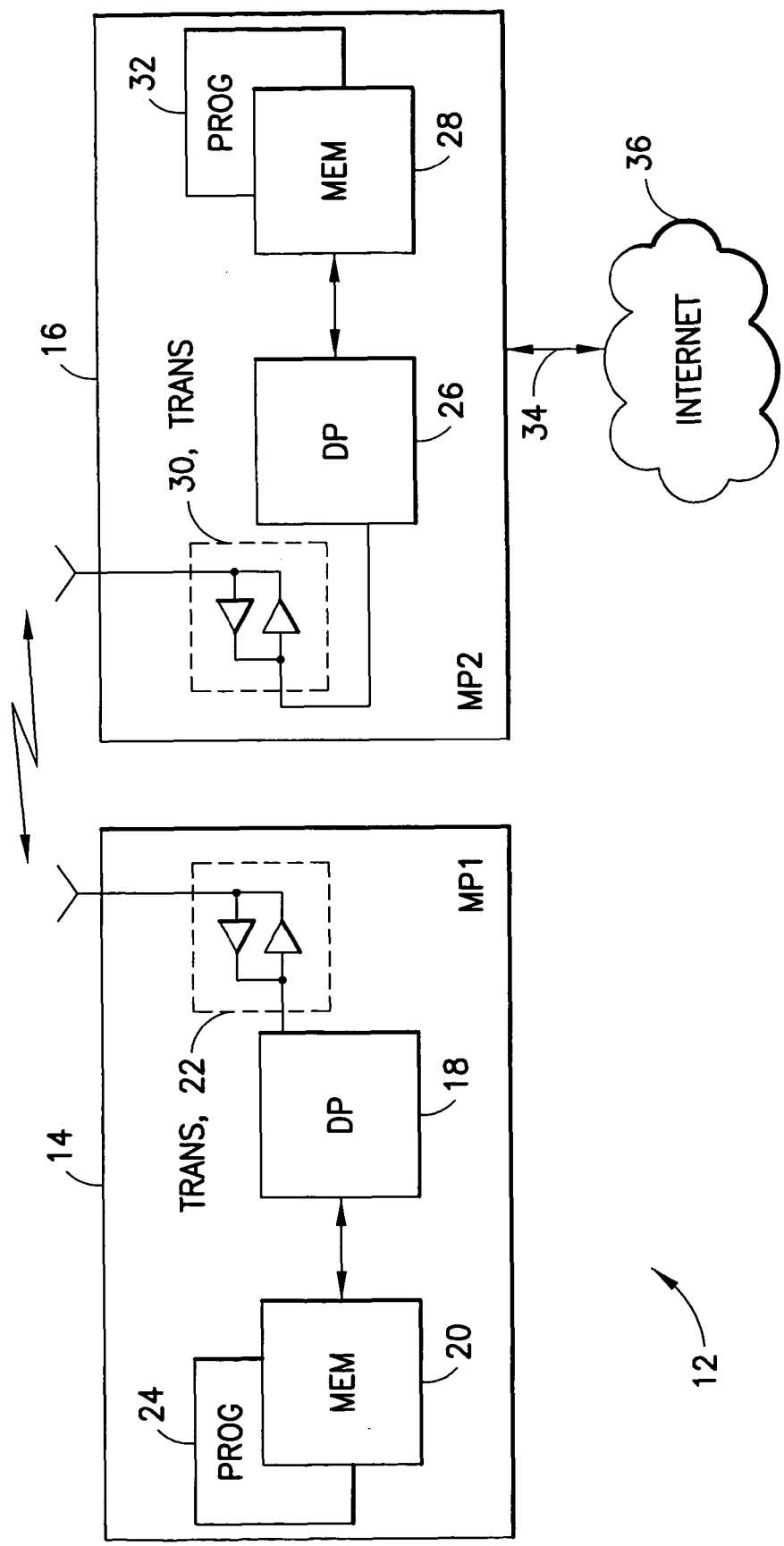
FIG. 4 shows a simplified block diagram of various electronic devices that are suitable for use in practicing the exemplary embodiments of this invention.

Reference is made to FIG. 4 for illustrating a simplified block diagram of various electronic devices that are suitable for use in practicing the exemplary embodiments of this invention. In FIG. 4, a wireless network 12 is adapted for communication with a first mesh point (MP1) 14 via a second mesh point (MP2) 16. The MP1 14 includes a control unit, such as one comprising a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the MP2 16. Note that the TRANS 22 has at least one antenna to facilitate communication.

The MP2 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the MP1 14. Note that the TRANS 30 has at least one antenna to facilitate communication. The MP2 16 is coupled via a data path 34 to one or more additional mesh points, external networks or systems, such as the internet 36, for example. Furthermore, the MP1 14 may also be coupled via a data path (not shown) to one or more additional mesh points, external networks or systems, such as the internet, for example.

At least one of the PROGs 24, 32 is assumed to include program instructions that, when executed by the associated DP, enable the electronic device to operate in accordance with the exemplary embodiments of this invention, as discussed herein.

In general, the various exemplary embodiments of the MP1 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the MP1 14 and the MP2 16, or by hardware, or by a combination of software and hardware. As a non-limiting example, one or more of the individual components of MP1 14 and/or MP2 16 may be implemented utilizing one or more Integrated Circuits (ICs) or Application Specific Integrated Circuits (ASICs).

The MEMs 20, 28 may be of any type suitable to the local technical environment and may be implemented using any suitable data storage technology, such as semiconductor based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

As presently specified the MP 14, 16 that transmitted the beacon is to remain in the awake state until the end of the Awake Window, and until a multicast (MC) or broadcast (BC) frame with data bit set to 0 is transmitted, whichever occurs later. In addition, the MP 14, 16 that is in a power save mode is to listen to the beacon and continue to receive MC/BC frames, or a beacon frame which indicates that all MC and BC frames are transmitted. As currently specified, there is no definition of a Post Groupcast Time (PGT) that is a feature of the exemplary embodiments of this invention.

The exemplary embodiments of this invention provide a predefined duration of time, referred to herein without loss of generality as the post groupcast time, that is independent of the Awake Window, and that is used by all (peer and beaconing) MPs. The PGT may be used for several purposes. For example, if transmission of multicast or broadcast frames has consumed all of the available Awake Window time, then there is enabled an ability to provide triggering after the Awake Window during the PGT. The PGT guarantees that the multicast transmitter will experience timeout before it returns to a power save state such as the doze state. The PGT also provides the ability to transmit the trigger frames for a peer service period, and ensures that the beaconing MP does not "disappear" immediately after the transmission of the last multicast or broadcast frame. Furthermore, in those MPs receiving multicast or broadcast frames, the PGT may be used to terminate the multicast and broadcast frame reception. If the last frame which contains a More Data (MD) bit that is set to 0 is not received, the MP receiver may assume that the transmission of the multicast and broadcast frames is ended, assuming that no additional frame(s) are received within the PGT after the reception of the last MC/BC frame. If no MC/BC frame is received, the PGT is measured from the beacon frame, or if no MC/BC or beacon frame is received the PGT is measured from TBTT.

Figure 6:
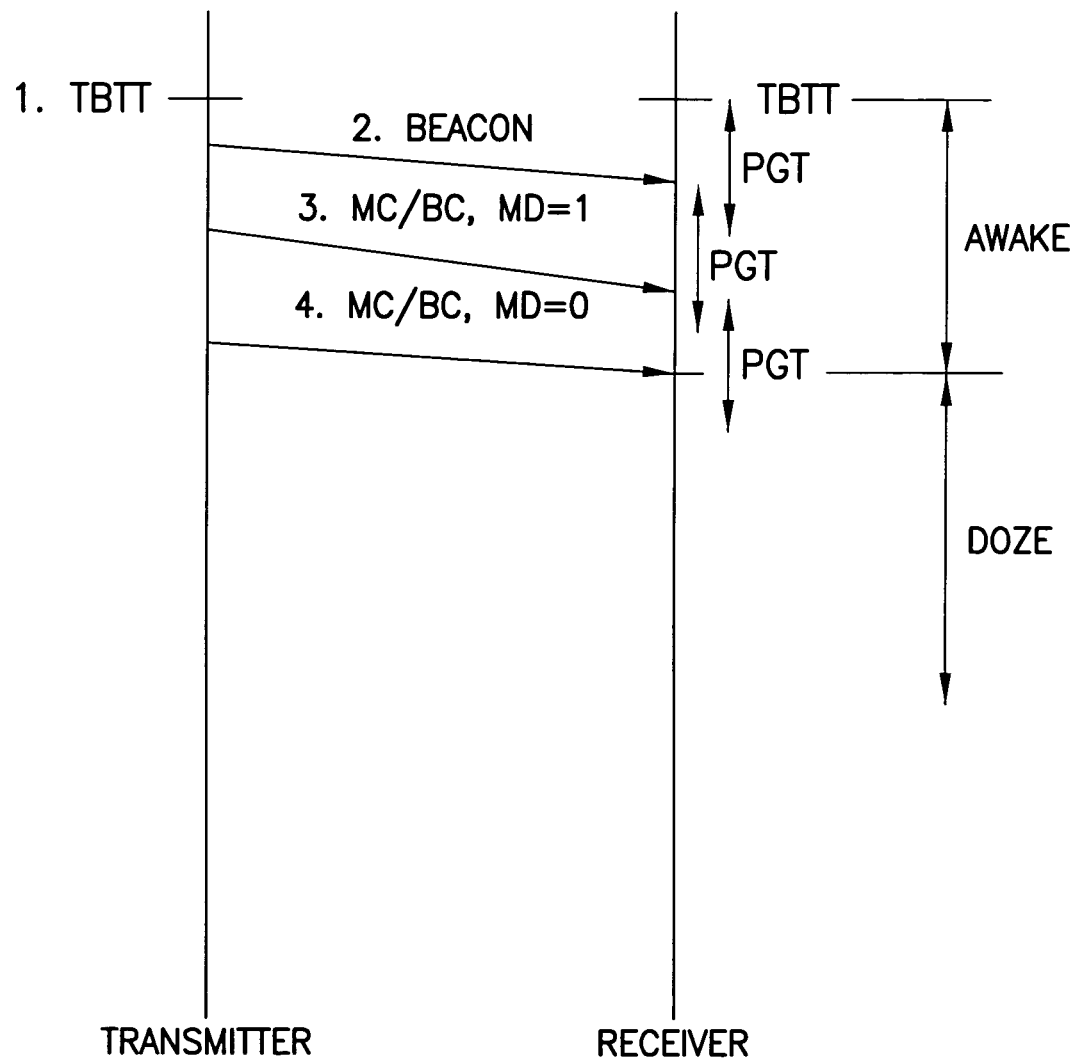
FIG. 6 is a message flow diagram between the transmitting and receiving MPs.

Reference can be made to FIGS. 5-7 for a further description of the exemplary embodiments.

FIG. 5A shows beaconing MP operation in the awake state for a last MC transmission. If the last MC transmission occurs after the Awake Window, the beaconing MP needs to stay awake until the end of the PGT.

FIG. 5B shows that if the last multicast transmission is performed within the Awake Window, the beaconing MP needs to stay awake until the end of Awake Window or until the end of the PGT, whichever occurs later.

FIG. 5C shows that if no multicast or broadcast frames are transmitted, the beaconing MP needs to stay awake until the end of the Awake Window.

FIG. 6 is a message flow diagram between the transmitting (beaconing) and receiving (peer) MPs. At time 1 the TBTT sets the PGT time, and at time 2 the Beacon frame is received before the PGT expires. The PGT is reset in this case. At time 3 the MC/BC frame is received before the PGT expires, and the PGT is reset. At time 4 a MC/BC frame indicating More Data set to 0 is received (indicating the last frame). The PGT timer is terminated and the MP may return to sleep.

Note that if the PGT would have expired in the previous steps the receiver is able to terminate media listening and return to the doze state. Note as well that the receiver preferably listens to the media until the PGT expires, or a frame indicating no further delivered traffic (MD bit equal to 0) is received.

FIG. 7A shows a case of the termination of receiver media listening when the last frame was incorrectly received. Assume in this case that the last transmitted multicast or broadcast frame is not received. The receiver needs to stay awake until the end of the PGT time. The PGT is measured from the last correctly received MC/BC or beacon or Target Beacon Transmission Time (TBTT), whichever occurs later. In FIG. 7A it is assumed that the beacon and the first MC/BC frame are received correctly, and that the last MC/BC frame is not erased.

FIG. 7B shows a case of the termination of receiver media listening when the last frame was correctly received. In this case the transmitter may return to a power save state after the receiver receives the last frame. If the beacon frame indicates that no multicast or broadcast frames are transmitted, the receiver may return to the power save state, such as to the doze state, after it has received the beacon frame.

There are a number of advantages that can be realized by the use of these exemplary embodiments. For example, the use of the invention enables improved controllability of the MP availability for peer MP triggering. In addition, the use of these exemplary embodiments enables the return to the power save state, even if the last multicast or broadcast frame is not received. This can reduce the power consumption in those cases where the last MC/BC frame is not received correctly.

In all of these embodiments it is desirable to ensure that the PGT is not made too short, as the reception of groupcast frames may be terminated unnecessarily.

It should be noted that there is a PGT reset after every frame transmission, such that the PGT is not the maximum duration of the Awake Window extension. In general, and as was made apparent above, the PGT represents an amount of time during which the beaconing MP operates in the awake state after its multicast or broadcast frames transmission, if the MC/BC frame transmission occurs after the Awake Window has expired. The PGT thus also represents the amount of time which the peer MPs need to remain in the awake state after the last TBTT, or received beacon, or MC/BC frame which indicates that more MC/BC frames will be transmitted. The indication that more MC/BC frames will be transmitted is given through the TIM element in the beacon frame, or through the More Data bit in MC/BC frame.

Note that if a Flexible Broadcast and Multicast Service (FBMS) is used the receiving MP may have knowledge of the multicast addresses from where the frames will be transmitted. If the MP knows that there will be transmissions only from multicast addresses which it is not (currently) receiving, it does not need to receive the MC/BC transmissions, regardless of the PGT value. That is, if the peer mesh point determines that it will not receive another multicast or broadcast frame during a current awake period, it can leave the awake state and enter a lower power mode of operation without regard for the value of the PGT timer. FBMS is described in the IEEE P802.11v™/D2.0 Draft Standard for Information Technology-Telecommunications and information exchange between systems-Local and metropolitan area networks-Specific requirements-Part 11: Wireless LAN Medium Access Control (MAC) and Physical Layer (PHY) specifications Amendment 9: Wireless Network Management (February 2008, which is an unapproved IEEE Standards Draft, subject to change). Reference can had made generally to Section 10.3.54, FBMS Setup, at pages 144-147.

The value for the PGT period may be defined in at least two ways. First, the duration of the PGT may be included as an Information Element (IE) in a beacon frame. In this case the value of the PGT is made link specific, and each MP defines the PGT value that is used by all peer MPs toward the beaconing MP. In this case each MP specifies its own PGT, and uses the PGT defined by the peer MP for the MC/BC or beacon transmissions of the peer MP. Second, the value of the PGT may be defined as a Management Information Base (MIB) variable. In this case there may be a constant value for the minimum duration of the PGT. In this second case then all MPs use the same value for the PGT and it is constant for all use case scenarios. An exemplary and non-limiting default (standardized) value for the PGT may be 3000 microseconds.

Note as well that both cases may be used, for example, the minimum PGT duration may be specified by a MIB element (standardized), and a given MP may define for a particular link a different value of the PGT duration (one that is not less than the globally specified minimum value). The value of the used PGT on any one or more particular links may be dynamically varied during operation of the mesh network.

For both cases discussed above (i.e., link specific and global) the format of the PGT is preferably the same. For example, in both of these cases the PGT field may be one octet in length, and the duration of the PGT may be represented as some integer number of 100 microsecond intervals. A zero value for the PGT may be considered to be a reserved value and not used.

Figure 8:
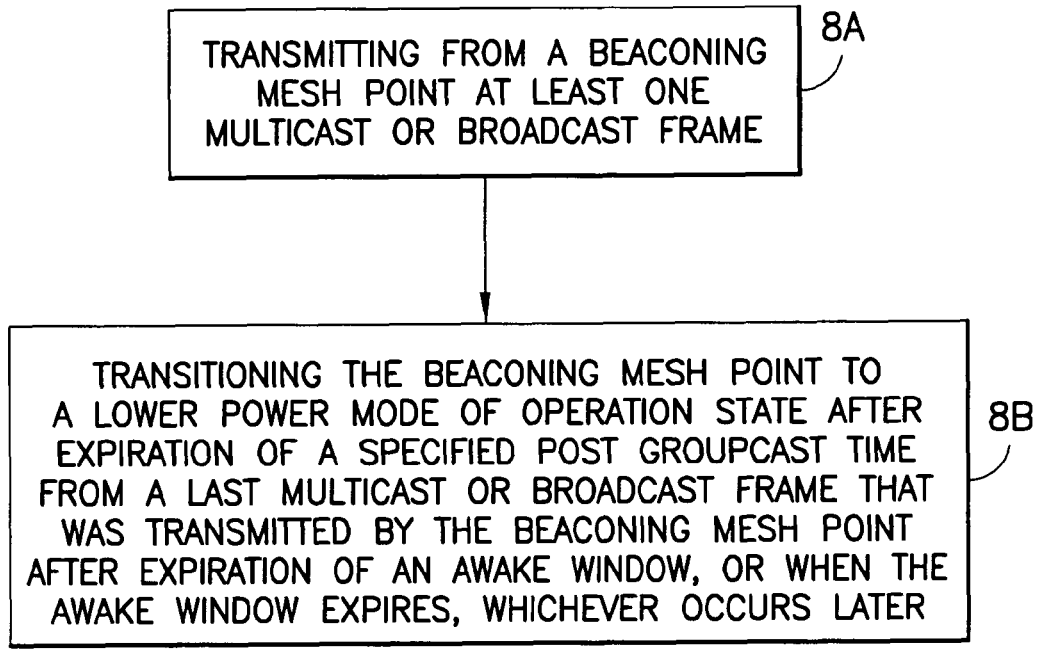
FIGS. 8 and 9 each present a logic flow diagram that illustrates the operation of a method, and a result of execution of computer program instructions, in accordance with the exemplary embodiments of this invention.

FIG. 8 is a logic flow diagram that illustrates the operation of a method by a beaconing MP, and a result of execution of computer program instructions, in accordance with the exemplary embodiments of this invention. In the method, and at Block 8A, there is a step of transmitting from a beaconing mesh point at least one multicast or broadcast frame and, at Block 8B, transitioning the beaconing mesh point to a lower power mode of operation state after expiration of a specified post groupcast time from a last multicast or broadcast frame that was transmitted by the beaconing mesh point after expiration of an Awake Window, or when the Awake Window expires, whichever occurs later.

The method of the preceding paragraph, where a value of the post groupcast time is specified in one or both of a global manner and a per link manner.

The method of the preceding paragraphs, where for a case where the beaconing mesh point does not transmit a multicast or broadcast transmission within the Awake Window, further comprising the beaconing mesh point entering the lower power mode of operation after expiration of the Awake Window.

Figure 9:
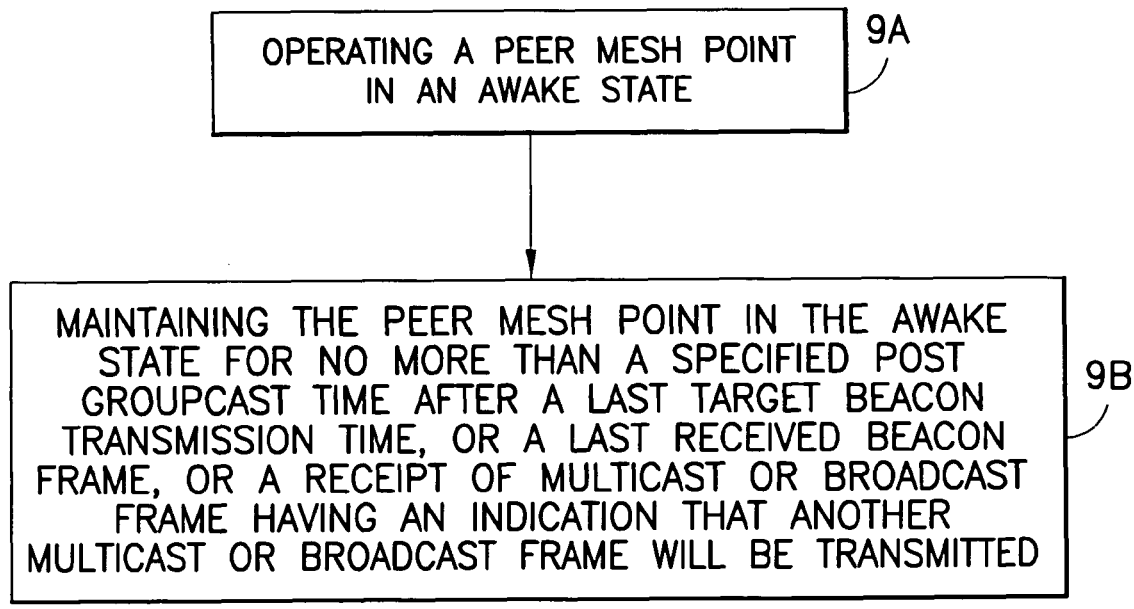

FIG. 9 is a logic flow diagram that illustrates the operation of a method by a peer MP, and a result of execution of computer program instructions, in accordance with the exemplary embodiments of this invention. In the method, and at Block 9A, there is a step of operating a peer mesh point in an awake state and, in Block 9B, a step of maintaining the peer mesh point in the awake state for no more than a specified post groupcast time after a last target beacon transmission time, or a last received beacon frame, or a receipt of multicast or broadcast frame having an indication that another multicast or broadcast frame will be transmitted.

The method of the preceding paragraph, where if no multicast or broadcast frame is received, the post groupcast time is measured from receipt of the beacon frame from a beaconing mesh point.

The method of the preceding paragraphs, where if no multicast, broadcast or beacon frame is received, the post groupcast time is measured from receipt of the target beacon transmission time from a beaconing mesh point.

The method of the preceding paragraphs, where if no beacon frame is received within the post groupcast time that is measured from receipt of the target beacon transmission time from a second mesh point, further comprising leaving the awake state.

The method of the preceding paragraphs, where a value of the post groupcast time is specified to the peer mesh point in one or both of a global manner and a per link manner.

The method of the preceding paragraphs, where if the peer mesh point determines that it will not receive another multicast frame or broadcast frame a during current awake period, further comprising leaving the awake state without regard for the post groupcast time.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the IEEE P802.11s system, it should be appreciated that the exemplary embodiments of this invention are not limited for use with only this one particular type of wireless communication system, and that they may be used to advantage in other wireless and wired communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof.

As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   transmitting with an apparatus operating as a first device of a wireless network at least one multicast or broadcast frame; and
   transitioning, with the apparatus, the first device to a lower power mode of operation state after expiration of a specified post groupcast time set by a transmitted multicast or broadcast frame that was transmitted by the first device during an awake window.

2. The method of claim 1, where a value of the post groupcast time is specified in one or both of a global manner and a per link manner.

3. The method of claim 1, where a duration of the awake window is extended by the post groupcast time, and further comprising the first device entering the lower power mode of operation after expiration of the extended awake window.

4. A non-transitory computer-readable medium that stores program instructions, the execution of which results in operations that comprise:
   transmitting from a first device of a wireless network at least one multicast or broadcast frame; and
   transitioning the first device to a lower power mode of operation state after expiration of a specified post groupcast time set by a transmitted multicast or broadcast frame that was transmitted by the first device during an awake window.

5. The non-transitory computer readable medium of claim 4, where a value of the post groupcast time is specified in one or both of a global manner and a per link manner.

6. The non-transitory computer readable medium of claim 4, where a duration of the awake window is extended by the post groupcast time, and further comprising the first device entering the lower power mode of operation after expiration of the extended awake window.

7. An apparatus, comprising:
   at least one processor; and
   at least one memory including computer program code, where the at least one memory and the computer program code are configured, with the at least one processor, to cause the apparatus to at least:
   transmit, when operating the apparatus as a first device of a wireless network, at least one multicast or broadcast frame; and
   transition to a lower power mode of operation state after expiration of a specified post groupcast time set by a transmitted multicast or broadcast frame that was transmitted by the first device during an awake window.

8. The apparatus of claim 7, where a value of the post groupcast time is specified in one or both of a global manner and a per link manner.

9. The apparatus of claim 7, where a duration of the awake window is extended by the post groupcast time, and where the at least one memory including the computer program code is configured, with the at least one processor, to cause the apparatus to cause the first mesh point to enter the lower power mode of operation after expiration of the extended awake window.

10. The apparatus of claim 7, where the at least one memory including the computer program code is configured, with the at least one processor, to cause the apparatus, when operated as the first device, to operate as a beaconing device in communication with at least one peer device.

11. The method of claim 3, where if the first device determines that it will not transmit another multicast frame or broadcast frame during the extended awake window, further comprising transitioning the first device to the low power mode of operation without regard for the post groupcast time.

12. The method of claim 1, where if the first device determines that it will not receive another multicast frame or broadcast frame during a current awake period, further comprising transitioning the first device to the low power mode of operation without regard for the post groupcast time.

13. The method of claim 1, where the post groupcast time is specified with at least one of an information element in a beacon frame, and a management information base variable.

14. The non-transitory computer-readable medium of claim 4, where if the first device determines that it will not receive another multicast frame or broadcast frame during a current awake period, further comprising transitioning the first device to the low power mode of operation without regard for the post groupcast time.

15. The apparatus of claim 7, comprising the at least one memory including the computer program code is configured, with the at least one processor, to cause the apparatus, in response to determining that it will not receive another multicast frame or broadcast frame during a current awake period, to transition the first device to the low power mode of operation without regard for the post groupcast time.

* * * * *